J. W. DONN.
Adjustable Bases for Tripods, &c.
No. 148,600. Patented March 17, 1874.
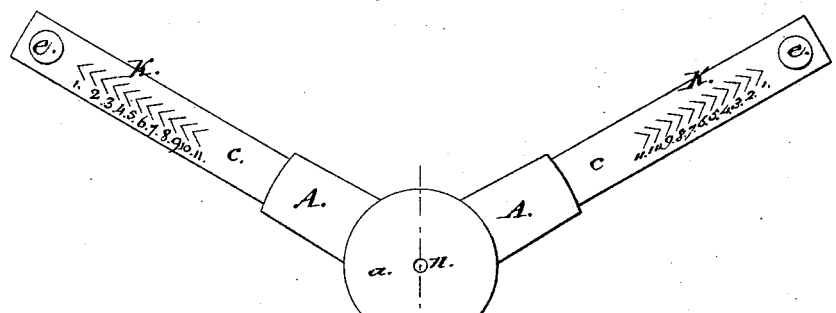
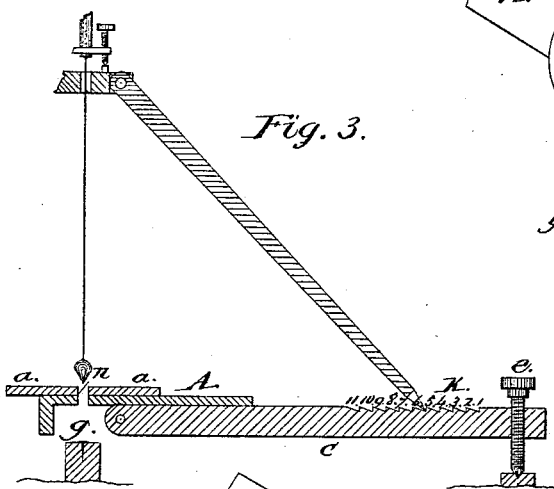
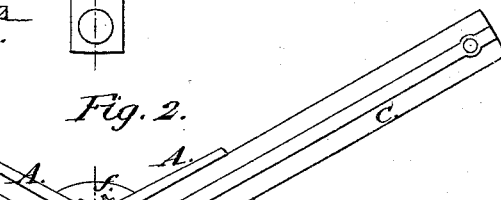
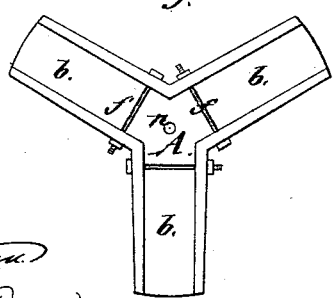

UNITED STATES PATENT OFFICE.

JOHN W. DONN, OF BALTIMORE, MARYLAND.

IMPROVEMENT IN ADJUSTABLE BASES FOR TRIPODS, &c.

Specification forming part of Letters Patent No. 148,600, dated March 17, 1874; application filed July 2, 1873.

*To all whom it may concern:*

Be it known that I, JOHN W. DONN, of Baltimore, in the county of Baltimore and State of Maryland, have invented certain new and useful Improvements in Adjusters for Field-Engineering Instruments; and I do hereby declare the following to be a full, clear, and exact description of the invention, such as will enable others skilled in the art to which it pertains to make and use it, reference being had to the accompanying drawings, which form part of this specification.

This invention has for its object the rapid and facile adjustment of the centers of field-engineering instruments over the spot or station-point.

The top view, Figure 1, and under view, Fig. 2, illustrate the device by which the desired result is attained.

A is a light frame of cast metal, having three arms, in which are the grooves or troughs $b$. The purpose of this frame is to receive and firmly hold the arms $c$, which are secured at their inner extremities to the frame by the bolts $f$. These bolts also form pivots, upon which the arms $c$ turn when the instrument is folded up.

A plan of frame A, with the bolts $f$, is shown in Fig. 4, and a sectional view on line $y\ y$ is shown in Fig. 5, which shows in detail the groove or trough in the frame, and the arm $c$ as it appears when the instrument is open for use.

Fig. 3 represents a vertical section of the adjuster in position, together with a part of the tripod of the instrument upon it, centered over the station-point $g$.

The cap $a$ covers the center of the frame A, and is in a plane parallel to the plane of the frame and arms $c$ when the adjuster is in position to receive the tripod, in which position the small hole $n$ in the center of the cap must exactly encircle the station-point, thus placing its center in the same vertical line with it and the plumb. $e$ are leveling-screws, placed in the outer extremities of arms $c$. They bear upon blocks placed upon the surface, or upon stout pins driven into the ground, as shown at $h$. Blocks would be used where the instrument was used on pavements, and pins when it was used in the country where the ground was marshy or sandy. The angular notches $k$ in arms $c$ are intended to hold the metal shoes of the tripod, and prevent them from slipping.

The adjuster is thus used: Open the arms $c$ and place the adjuster upon the ground, so that the small hole $n$ in cap $a$ will allow the station-point $g$ to be seen. Place blocks or pins under each arm, so that the leveling-screws $e$ will bear upon them, and then with the screws bring the adjuster to the horizontal plane, using for the purpose a small hand-level, set upon the cap $a$. After leveling the adjuster, the small hole $n$ should be made to exactly encircle the station-point. The tripod should then be placed upon the adjuster, as shown in Fig. 3, the feet being placed in the notches having corresponding numbers. After placing the tripod upon the adjuster, if it is found that the plumb does not fall exactly over the station-point, it may be made to do so by shifting one or two of the feet to notches nearer or farther from the center.

I claim—

An adjuster for field-engineering instruments composed of cap $a$, metal frame A, arms $c$, having notches 1 2 3 4 5, &c., with their several parts and attachments arranged, constructed, and used in the manner and for the purpose described.

In testimony that I claim the foregoing I have hereunto set my hand this 16th day of June, 1873.

JOHN W. DONN.

Witnesses:
 WILTON C. DONN,
 B. TRAUTMAN.